United States Patent
Huang et al.

(10) Patent No.: US 12,280,565 B2
(45) Date of Patent: Apr. 22, 2025

(54) POLYMER FILM AND USES OF THE SAME

(71) Applicant: Chang Chun Petrochemical Co., Ltd., Taipei (TW)

(72) Inventors: Yen-Chen Huang, Taipei (TW); Tzu-Jung Huang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/931,216

(22) Filed: Sep. 12, 2022

(65) Prior Publication Data

US 2023/0256719 A1   Aug. 17, 2023

(30) Foreign Application Priority Data

Feb. 11, 2022 (CN) .......................... 202210127728.5
Feb. 11, 2022 (TW) .................................. 111105146

(51) Int. Cl.
     *B32B 17/10* (2006.01)

(52) U.S. Cl.
     CPC .. *B32B 17/10761* (2013.01); *B32B 17/10036* (2013.01); *B32B 17/10605* (2013.01); *B32B 2250/03* (2013.01); *B32B 2250/40* (2013.01); *B32B 2307/538* (2013.01); *B32B 2307/732* (2013.01)

(58) Field of Classification Search
     CPC ........ B32B 17/10761; B32B 17/10036; B32B 17/10605; B32B 2250/03; B32B 2250/40; B32B 2307/538; B32B 2307/732; B32B 3/263; B32B 17/10568; B32B 17/10779; B32B 17/10587; B32B 17/1055; B32B 27/22; B32B 27/30; B32B 27/08; B32B 27/306; B32B 2315/08; B32B 2329/06; B32B 2605/006; B32B 2605/08; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959
     USPC .......................... 428/156, 172, 212, 213, 214
     See application file for complete search history.

(56) References Cited

U.S. PATENT DOCUMENTS

| | | | |
|---|---|---|---|
| 4,925,725 A | 5/1990 | Endo et al. | |
| 5,425,977 A | 6/1995 | Hopfe | |
| 5,595,818 A * | 1/1997 | Hopfe | B32B 17/10577 525/154 |
| 2013/0236693 A1 | 9/2013 | Lu | |
| 2016/0159041 A1* | 6/2016 | Lu | B60J 1/02 428/161 |
| 2021/0162717 A1 | 6/2021 | Chang et al. | |
| 2021/0162718 A1 | 6/2021 | Huang et al. | |
| 2021/0163697 A1 | 6/2021 | Huang et al. | |
| 2023/0142686 A1 | 5/2023 | Teraguchi et al. | |

FOREIGN PATENT DOCUMENTS

| | | |
|---|---|---|
| JP | 2000-044295 A | 2/2000 |
| JP | 2000-203900 A | 7/2000 |
| JP | 2018-531203 A | 10/2018 |
| JP | 2021-099436 A | 7/2021 |
| TW | 202126489 A | 7/2021 |
| WO | WO 2017/023673 A1 | 2/2017 |
| WO | WO 2019/003579 A1 | 1/2019 |
| WO | WO 2021/141098 A1 | 7/2021 |
| WO | WO-2021131367 A1 * | 7/2021 |
| WO | WO 2021/215455 A1 | 10/2021 |

* cited by examiner

*Primary Examiner* — Megha M Gaitonde
(74) *Attorney, Agent, or Firm* — Christensen, Fonder, Dardi & Herbert PLLC

(57) ABSTRACT

A polymer film and laminated glass manufactured using the same are provided. The polymer film has a first surface and a second surface, wherein the first surface has a root mean square gradient (Sdq) ranging from 0.1 to 1.5 and a root mean square height (Sq) ranging from 1 μm to 15 μm, wherein Sdq and Sq are defined in accordance with ISO 25178-2:2012.

10 Claims, No Drawings

POLYMER FILM AND USES OF THE SAME

CLAIM FOR PRIORITY

This application claims the benefit of Taiwan Patent Application No. 111105146 filed on Feb. 11, 2022, and the benefit of China Patent Application No. 202210127728.5 filed on Feb. 11, 2022, the subject matters of which are incorporated herein in their entirety by reference.

BACKGROUND OF THE INVENTION

Field of the Invention

The present invention relates to polymer film, especially to polymer film with a specific root mean square gradient and root mean square height suitable for nip roller pre-pressing. The present invention also relates to laminated glass manufactured by using polymer film.

Descriptions of the Related Art

Laminated glass is a glass material with a composite structure formed by interposing a polymer film between two glass sheets and performing hot-pressing to bond the glass sheets and the polymer film tightly together. Since laminated glass has superior impact resistance and acoustic insulation property, it is widely used in automobile and building industries.

Since the manufacturing process of laminated glass involves the hot-pressing of glass sheets and a polymer film, to avoid leaving air between the glass sheets and polymer film of the laminated glass, the surfaces of the polymer film are usually embossed in advance to form textures (i.e., a designed concavo-convex structure) to facilitate de-airing during pre-pressing, thereby avoiding generating bubbles in the laminated glass. The pre-pressing methods generally include a vacuum system and a nip roll system. In the nip roll system, since the duration of heating is shorter, the textures on the surface of the polymer film may flatten too slow, meaning the air between the glass sheets and polymer film cannot be removed entirely due to the incomplete elimination of the textures on the surface of the polymer film. This results in poor transparency or bubble defects.

SUMMARY OF THE INVENTION

Interestingly, the inventors found that the above problems could be resolved by controlling the root mean square gradient (Sdq) and root mean square height (Sq) of the surface of the polymer film. Thus, the present invention relates to a polymer film with a specific root mean square gradient and a specific root mean square height. The polymer film of the present invention can achieve an excellent pre-pressing result during the pre-pressing process of the laminated glass via a nip roll system. The laminated glass manufactured from there has no bubble defects and has excellent weatherability. The weatherability is demonstrated by the result of the "high-temperature bubble test".

Specifically, an objective of the present invention is to provide a polymer film, which has a first surface and a second surface, in which the first surface has a root mean square gradient (Sdq) ranging from 0.1 to 1.5 and a root mean square height (Sq) ranging from 1 μm to 15 μm, wherein the Sdq and Sq are defined in accordance with ISO 25178-2:2012.

In some embodiments of the present invention, the second surface has a root mean square gradient (Sdq) ranging from 0.1 to 1.5 and a root mean square height (Sq) ranging from 1 μm to 15 μm, wherein the Sdq and Sq are defined in accordance with ISO 25178-2:2012.

In some embodiments of the present invention, the polymer film has a glass transition temperature (Tg) ranging from 5° C. to 30° C.

In some embodiments of the present invention, the polymer film comprises polyvinyl acetal.

In some embodiments of the present invention, the polyvinyl acetal can be selected from the group consisting of poly(vinyl formal), poly(vinyl acetal), poly(vinyl butyral), poly(vinyl pentanal), poly(vinyl hexanal), and combinations thereof. In the preferred embodiments of the present invention, the polyvinyl acetal is poly(vinyl butyral).

In some embodiments of the present invention, the polyvinyl acetal has a weight average molecular weight (Mw) ranging from 230,000 Daltons to 280,000 Daltons.

In some embodiments of the present invention, the polymer film further comprises a plasticizer.

In some embodiments of the present invention, based on 100 parts by weight of the polyvinyl acetal, the amount of the plasticizer ranges from 30 parts by weight to 50 parts by weight.

In some embodiments of the present invention, the polymer film has a thickness ranging from 0.1 mm to 2.5 mm.

Another objective of the present invention is to provide a laminated glass, which comprises a first glass sheet, a second glass sheet, and an intermediate film disposed between the first glass sheet and the second glass sheet, wherein the intermediate film is provided by the polymer film as mentioned earlier.

To render the above objectives, technical features and advantages of the present invention more apparent, the present invention will be described in detail with reference to some embodiments from now on.

BRIEF DESCRIPTION OF THE DRAWINGS

Not applicable.

DESCRIPTION OF THE PREFERRED EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and the claims should include both the singular and the plural forms.

Unless otherwise specified, the expressions "first," "second," or the like recited in the specification and the claims are merely used to distinguish the illustrated elements or constituents and have no special meanings. Those expressions are not used to represent any priority.

The term "root mean square gradient (Sdq)" recited in the specification and the claims is defined in accordance with ISO 25178-2:2012. The root mean square gradient (Sdq) is the root mean square value of slopes at all points in the defined area of the surface of the polymer film. The Sdq indicates the steepness of the surface. When the surface is totally flat, Sdq is 0 (zero). The larger the Sdq, the steeper the incline of the surface. For example, when the surface is at a 45-degree incline, the Sdq is 1 (one).

The term "root mean square height (Sq)" recited in the specification and the claims is defined in accordance with ISO 25178-2:2012. The root mean square height (Sq) is the root mean square value of heights at all points in the defined area of the surface of the polymer film, and corresponds to a standard deviation of heights. The Sq indicates the consistency of the heights of the textures. A low Sq value indicates that the heights of the textures are similar, meaning the consistency is high. A high Sq value indicates that the heights of the textures are diverse, meaning the consistency is low.

The present invention provides a polymer film with a specific root mean square gradient and a root mean square height and utilizes the polymer film to provide laminated glass with no bubbles or white haze defects and good transparency. The polymer film of the present invention is particularly suitable for nip roll pre-pressing. The polymer film of the present invention and the applications thereof are described in detail below.

1. Polymer Film 1.1. Surface Characteristics of Polymer Film

In the manufacture of laminated glass, in order to avoid leaving air between the glass sheets and polymer film, the surfaces of the polymer film are usually formed with textures (i.e., a specific concavo-convex structure) which facilitate de-airing during pre-pressing. During pre-pressing, the elimination of air between the polymer film and glass sheets is in all directions rather than in one single direction, meaning that the de-airing occurs in a two-dimensional space (i.e., a plane). In this respect, the inventors found that the de-airing problem confronted during the nip roll pre-pressing of the laminated glass could be resolved by controlling the root mean square gradient (Sdq) and root mean square height (Sq) values of the surface of the polymer film within specific ranges. No bubbles or white haze defects are found after the pre-pressing, and the laminated glass manufactured therefrom has excellent weatherability, as demonstrated by the result of the "high-temperature bubble test". The Sdq and Sq are parameters relevant to surface roughness. The relevant descriptions for the Sdq and Sq parameters can refer to ISO 25178-2:2012, which is a measurement standard for evaluating surface morphology, and the subject matters of which are incorporated herein in their entirety by reference.

Specifically, the polymer film of the present invention has a first surface and a second surface, wherein the first surface has an Sdq ranging from 0.1 to 1.5. For example, the Sdq of the first surface can be 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, or 1.5, or within a range between any two of the values described herein. In the preferred embodiments of the present invention, the first surface has an Sdq ranging from 0.35 to 1.3. Studies have suggested that when the Sdq value of the first surface of the polymer film is controlled within the designated range, the de-airing performance during the pre-pressing via a nip roll system can be improved, thereby avoiding incomplete elimination of the textures on the surface of the polymer film. The pre-pressed laminated glass does not have bubble defects, and the white haze defects within the pre-pressed laminated glass can be effectively inhibited. The "white haze defect" is a phenomenon due to the residual air inside the polymer film. In the case that the white haze defect is slight, the residual air can dissolve into the polymer film after subsequent autoclave pressing, making the white haze defect disappears temporarily, which is called "air dissolution".

In addition, the first surface has an Sq ranging from 1 μm to 15 μm. For example, the Sq of the first surface can be 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, 3 μm, 3.1 μm, 3.2 μm, 3.3 μm, 3.4 μm, 3.5 μm, 3.6 μm, 3.7 μm, 3.8 μm, 3.9 μm, 4 μm, 4.1 μm, 4.2 μm, 4.3 μm, 4.4 μm, 4.5 μm, 4.6 μm, 4.7 μm, 4.8 μm, 4.9 μm, 5 μm, 5.1 μm, 5.2 μm, 5.3 μm, 5.4 μm, 5.5 μm, 5.6 μm, 5.7 μm, 5.8 μm, 5.9 μm, 6 μm, 6.1 μm, 6.2 μm, 6.3 μm, 6.4 μm, 6.5 μm, 6.6 μm, 6.7 μm, 6.8 μm, 6.9 μm, 7 μm, 7.1 μm, 7.2 μm, 7.3 μm, 7.4 μm, 7.5 μm, 7.6 μm, 7.7 μm, 7.8 μm, 7.9 μm, 8 μm, 8.1 μm, 8.2 μm, 8.3 μm, 8.4 μm, 8.5 μm, 8.6 μm, 8.7 μm, 8.8 μm, 8.9 μm, 9 μm, 9.1 μm, 9.2 μm, 9.3 μm, 9.4 μm, 9.5 μm, 9.6 μm, 9.7 μm, 9.8 μm, 9.9 μm, 10 μm, 10.1 μm, 10.2 μm, 10.3 μm, 10.4 μm, 10.5 μm, 10.6 μm, 10.7 μm, 10.8 μm, 10.9 μm, 11 μm, 11.1 μm, 11.2 μm, 11.3 μm, 11.4 μm, 11.5 μm, 11.6 μm, 11.7 μm, 11.8 μm, 11.9 μm, 12 μm, 12.1 μm, 12.2 μm, 12.3 μm, 12.4 μm, 12.5 μm, 12.6 μm, 12.7 μm, 12.8 μm, 12.9 μm, 13 μm, 13.1 μm, 13.2 μm, 13.3 μm, 13.4 μm, 13.5 μm, 13.6 μm, 13.7 μm, 13.8 μm, 13.9 μm, 14 μm, 14.1 μm, 14.2 μm, 14.3 μm, 14.4 μm, 14.5 μm, 14.6 μm, 14.7 μm, 14.8 μm, 14.9 μm, or 15 μm, or within a range between any two of the values described herein. In the preferred embodiments of the present invention, the first surface has an Sq ranging from 2 μm to 10 μm. Studies have suggested that when the Sdq value and the Sq value of the first surface of the polymer film are both controlled within the designated ranges, the de-airing performance during the pre-pressing via a nip roll system can be optimized. The pre-pressed laminated glass has less white haze defect or no white haze defect. Furthermore, even the residual air can be dissolved into the polymer film after autoclave pressing of the laminated glass; and if the amount of the dissolved air (air dissolution) is too high, the dissolved air will be released and become bubbles within the laminated glass once the laminated glass has been used for a long time or has been subjected to a strict condition. In this respect, the laminated glass of the present invention not only has no bubble defects after being subjected to autoclave pressing but also has excellent weatherability (i.e., excellent result in the "high-temperature bubble test").

In the preferred embodiments of the present invention, the second surface of the polymer film also has the aforementioned Sdq and Sq properties; that is, the Sdq of the second surface ranges from 0.1 to 1.5, and the Sq of the second surface ranges from 1 μm to 15 μm. The examples of the specific values regarding the Sdq and Sq properties of the second surface can refer to the relevant descriptions for the first surface.

1.2. Constitution of Polymer Film

The polymer film of the present invention comprises polyvinyl acetal as an essential constituent and may further comprise other optional constituents, such as a plasticizer or other conventional additives, depending on the needs. In some embodiments of the present invention, the polymer film comprises polyvinyl acetal and a plasticizer or the polymer film consists essentially of polyvinyl acetal and a plasticizer, or the polymer film consists of polyvinyl acetal and a plasticizer.

The polymer film of the present invention may be a single-layer film composed of one single layer or a multi-layer film composed of multiple layers, as long as the polymer film as a whole has the designated Sdq value and Sq value. When the polymer film is a multilayer film, the layers of the polymer film can be made of identical or different materials and thus can be identical or different functional layers. The above-mentioned functional layer may be, for example, a layer with one or more of the following functions: acoustic insulation function, thermal insulation function, reflection function, anti-reflection function, refraction function, anti-refraction function, light-splitting function, and dimming function.

1.2.1. Polyvinyl Acetal

Examples of polyvinyl acetal include but are not limited to poly(vinyl formal), poly(vinyl acetal), poly(vinyl butyral), poly(vinyl pentanal), and poly(vinyl hexanal). The above polyvinyl acetal can either be used alone or in a mixture of two or more. In the preferred embodiments of the present invention, the polyvinyl acetal is poly(vinyl butyral). In the appended examples, the polymer film consists of poly(vinyl butyral) and a plasticizer.

The molecular weight of the polyvinyl acetal is not particularly limited. In some embodiments of the present invention, the weight average molecular weight (Mw) of the polyvinyl acetal can range from 230,000 Daltons to 280,000 Daltons. For example, the Mw of the polyvinyl acetal can be 230,000 Daltons, 230,500 Daltons, 231,000 Daltons, 231,500 Daltons, 232,000 Daltons, 232,500 Daltons, 233,000 Daltons, 233,500 Daltons, 234,000 Daltons, 234,500 Daltons, 235,000 Daltons, 235,500 Daltons, 236,000 Daltons, 236,500 Daltons, 237,000 Daltons, 237,500 Daltons, 238,000 Daltons, 238,500 Daltons, 239,000 Daltons, 239,500 Daltons, 240,000 Daltons, 240,500 Daltons, 241,000 Daltons, 241,500 Daltons, 242,000 Daltons, 242,500 Daltons, 243,000 Daltons, 243,500 Daltons, 244,000 Daltons, 244,500 Daltons, 245,000 Daltons, 245,500 Daltons, 246,000 Daltons, 246,500 Daltons, 247,000 Daltons, 247,500 Daltons, 248,000 Daltons, 248,500 Daltons, 249,000 Daltons, 249,500 Daltons, 250,000 Daltons, 250,500 Daltons, 251,000 Daltons, 251,500 Daltons, 252,000 Daltons, 252,500 Daltons, 253,000 Daltons, 253,500 Daltons, 254,000 Daltons, 254,500 Daltons, 255,000 Daltons, 255,500 Daltons, 256,000 Daltons, 256,500 Daltons, 257,000 Daltons, 257,500 Daltons, 258,000 Daltons, 258,500 Daltons, 259,000 Daltons, 259,500 Daltons, 260,000 Daltons, 260,500 Daltons, 261,000 Daltons, 261,500 Daltons, 262,000 Daltons, 262,500 Daltons, 263,000 Daltons, 263,500 Daltons, 264,000 Daltons, 264,500 Daltons, 265,000 Daltons, 265,500 Daltons, 266,000 Daltons, 266,500 Daltons, 267,000 Daltons, 267,500 Daltons, 268,000 Daltons, 268,500 Daltons, 269,000 Daltons, 269,500 Daltons, 270,000 Daltons, 270,500 Daltons, 271,000 Daltons, 271,500 Daltons, 272,000 Daltons, 272,500 Daltons, 273,000 Daltons, 273,500 Daltons, 274,000 Daltons, 274,500 Daltons, 275,000 Daltons, 275,500 Daltons, 276,000 Daltons, 276,500 Daltons, 277,000 Daltons, 277,500 Daltons, 278,000 Daltons, 278,500 Daltons, 279,000 Daltons, 279,500 Daltons, or 280,000 Daltons, or within a range between any two of the values described herein, but the present invention is not limited thereto. In the preferred embodiments of the present invention, the Mw of the polyvinyl acetal ranges from 240,000 Daltons to 260,000 Daltons.

In some embodiments of the present invention, based on the total number of moles of hydroxyl, acetal group, and acetyl group of polyvinyl acetal, polyvinyl acetal can have a content of acetal group (i.e., a degree of acetalization) ranging from 69 mol % to 75 mol %. For example, based on the total number of moles of hydroxyl, acetal group, and acetyl group of polyvinyl acetal, the degree of acetalization of the polyvinyl acetal can be 69 mol %, 69.1 mol %, 69.2 mol %, 69.3 mol %, 69.4 mol %, 69.5 mol %, 69.6 mol %, 69.7 mol %, 69.8 mol %, 69.9 mol %, 70 mol %, 70.1 mol %, 70.2 mol %, 70.3 mol %, 70.4 mol %, 70.5 mol %, 70.6 mol %, 70.7 mol %, 70.8 mol %, 70.9 mol %, 71 mol %, 71.1 mol %, 71.2 mol %, 71.3 mol %, 71.4 mol %, 71.5 mol %, 71.6 mol %, 71.7 mol %, 71.8 mol %, 71.9 mol %, 72 mol %, 72.1 mol %, 72.2 mol %, 72.3 mol %, 72.4 mol %, 72.5 mol %, 72.6 mol %, 72.7 mol %, 72.8 mol %, 72.9 mol %, 73 mol %, 73.1 mol %, 73.2 mol %, 73.3 mol %, 73.4 mol %, 73.5 mol %, 73.6 mol %, 73.7 mol %, 73.8 mol %, 73.9 mol %, 74 mol %, 74.1 mol %, 74.2 mol %, 74.3 mol %, 74.4 mol %, 74.5 mol %, 74.6 mol %, 74.7 mol %, 74.8 mol %, 74.9 mol %, or 75 mol %, or within a range between any two of the values described herein. In the preferred embodiments of the present invention, based on the total number of moles of hydroxyl, acetal group, and acetyl group of polyvinyl acetal, the polyvinyl acetal can have a content of acetal group (i.e., a degree of acetalization) ranging from 71.4 mol % to 73 mol %.

In some embodiments of the present invention, based on the total number of moles of hydroxyl, acetal group, and acetyl group of polyvinyl acetal, polyvinyl acetal can have a content of acetyl group (i.e., a degree of acetylization) ranging from 0 mol % to 1.0 mol %. For example, based on the total number of moles of hydroxyl, acetal group, and acetyl group of polyvinyl acetal, the degree of acetylization of polyvinyl acetal can be 0 mol %, 0.05 mol %, 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, or 1.0 mol %, or within a range between any two of the values described herein. In the preferred embodiments of the present invention, based on the total number of moles of hydroxyl, acetal group, and acetyl group of polyvinyl acetal, the polyvinyl acetal can have a content of acetyl group (i.e., a degree of acetylization) ranging from 0 mol % to 0.6 mol %. If the degree of acetylization of polyvinyl acetal is higher than the designated range, the polymer film is relatively soft, and the embossed textures could be too deep.

In some embodiments of the present invention, based on the total number of moles of hydroxyl, acetal group, and acetyl group of polyvinyl acetal, polyvinyl acetal can have a content of hydroxyl ranging from 25 mol % to 30 mol %. For example, based on the total number of moles of hydroxyl, acetal group, and acetyl group of polyvinyl acetal, the content of hydroxyl of polyvinyl acetal can be 25 mol %, 25.1 mol %, 25.2 mol %, 25.3 mol %, 25.4 mol %, 25.5 mol %, 25.6 mol %, 25.7 mol %, 25.8 mol %, 25.9 mol %, 26 mol %, 26.1 mol %, 26.2 mol %, 26.3 mol %, 26.4 mol %, 26.5 mol %, 26.6 mol %, 26.7 mol %, 26.8 mol %, 26.9 mol %, 27 mol %, 27.1 mol %, 27.2 mol %, 27.3 mol %, 27.4 mol %, 27.5 mol %, 27.6 mol %, 27.7 mol %, 27.8 mol %, 27.9 mol %, 28 mol %, 28.1 mol %, 28.2 mol %, 28.3 mol %, 28.4 mol %, 28.5 mol %, 28.6 mol %, 28.7 mol %, 28.8 mol %, 28.9 mol %, 29 mol %, 29.1 mol %, 29.2 mol %, 29.3 mol %, 29.4 mol %, 29.5 mol %, 29.6 mol %, 29.7 mol %, 29.8 mol %, 29.9 mol %, or 30 mol %, or within a range between any two of the values described herein. In the preferred embodiments of the present invention, based on the total number of moles of hydroxyl, acetal group, and acetyl group of polyvinyl acetal, the polyvinyl acetal can have a content of hydroxyl ranging from 27 mol % to 29 mol %. When the content of hydroxyl of the polyvinyl acetal is higher than the designated range, the polymer film is relatively hard, making it relatively difficult to form embossed textures. When the content of hydroxyl of the polyvinyl acetal is lower than the designated range, the polymer film is relatively soft, and the embossed textures could be too deep.

1.2.2. Plasticizer

As used herein, a plasticizer, also called a plasticizing agent, is a chemical substance that can modify the plasticity of a thermoplastic resin. Examples of the plasticizer include but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof. In the appended examples, triethylene glycol bis(2-ethylhexanoate) is used as the plasticizer.

The amount of the plasticizer is not particularly limited, as long as the plasticizer can provide the desired plasticizing effect. In general, based on 100 parts by weight of polyvinyl acetal, the amount of the plasticizer can range from 30 parts by weight to 50 parts by weight. For example, based on 100 parts by weight of polyvinyl acetal, the amount of the plasticizer can be 30 parts by weight, 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, or 50 parts by weight, or within a range between any two of the values described herein. In some embodiments of the present invention, based on 100 parts by weight of polyvinyl acetal, the amount of the plasticizer ranges from 35 parts by weight to 45 parts by weight.

1.2.3. Other Conventional Additives

The polymer film may further comprise other conventional additives that can adaptively improve the workability of the polymer film during its manufacture or impart specific functions to the polymer film. Examples of the conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a mixture of two or more. For example, the polymer film can further comprise a dye or pigment to become a colored polymer film. The polymer film can also comprise an ultraviolet absorber or infrared absorber to have an anti-ultraviolet function or anti-infrared function.

1.3. Other Properties of Polymer Film 1.3.1. Glass Transition Temperature (Tg)

In some embodiments of the present invention, the glass transition temperature (Tg) of the polymer film may range from 5° C. to 30° C. For example, the Tg of the polymer film can be 5° C., 5.5° C., 6° C., 6.5° C., 7° C., 7.5° C., 8° C., 8.5° C., 9° C., 9.5° C., 10° C., 10.5° C., 11° C., 11.5° C., 12° C., 12.5° C., 13° C., 13.5° C., 14° C., 14.5° C., 15° C., 15.5° C., 16° C., 16.5° C., 17° C., 17.5° C., 18° C., 18.5° C., 19° C., 19.5° C., 20° C., 20.5° C., 21° C., 21.5° C., 22° C., 22.5° C., 23° C., 23.5° C., 24° C., 24.5° C., 25° C., 25.5° C., 26° C., 26.5° C., 27° C., 27.5° C., 28° C., 28.5° C., 29° C., 29.5° C., or 30° C., or within a range between any two of the values described herein. When the Tg of the polymer film is higher than the designated range, the polymer film is relatively hard, making it relatively difficult to form textures via machine embossing. When the Tg of the polymer film is lower than the designated range, the polymer film is relatively soft, and the embossed textures formed via machine embossing can be too deep. In the preferred embodiments of the present invention, the Tg of the polymer film ranges from 10° C. to 25° C.

1.3.2. Thickness

The thickness of the polymer film of the present invention can be adjusted depending on the needs as long as the polymer film has the designated Sdq value and Sq value. In general, the thickness of the polymer film can range from 0.1 mm to 2.5 mm. For example, the thickness of the polymer film can be 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, 1.6 mm, 1.65 mm, 1.7 mm, 1.75 mm, 1.8 mm, 1.85 mm, 1.9 mm, 1.95 mm, 2.0 mm, 2.05 mm, 2.1 mm, 2.15 mm, 2.2 mm, 2.25 mm, 2.3 mm, 2.35 mm, 2.4 mm, 2.45 mm, or 2.5 mm, or within a range between any two of the values described herein. In the appended examples, the thickness of the polymer film is 0.76 mm.

1.4. Manufacture of Polymer Film

The method for preparing the polymer film of the present invention is not particularly limited. For example, the polymer film of the present invention may be manufactured by mixing and kneading the polyvinyl acetal and optional constituents (e.g., a plasticizer) to obtain a polymer composition, using the polymer composition to provide a polymer film by means of a conventional film forming method, and performing the machine embossing step to provide the desired Sdq value and Sq value on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film is manufactured as follows, but the present invention is not limited thereto. A polyvinyl acetal resin and a plasticizer are mixed and kneaded by using a mixer at a temperature ranging from 150° C. to 250° C. and a rotation speed ranging from 100 rpm to 250 rpm for 5 minutes to 30 minutes to obtain a polymer composition. The polymer composition is cooled down to room temperature and then placed in an extruder to form a film. The above-mentioned film-forming steps can be optionally repeated, and the constitution of the polymer composition can be optionally adjusted to provide films with different functions, and these films can be laminated to form a polymer film with a multilayer structure.

Afterwards, the polymer film is subjected to preheating and machine embossing to provide the desired Sdq value and Sq value. The machine embossing is directed to a process of forming textures on the surface of the prepared polymer film by using a roller. The methods for machine embossing include but are not limited to an embossing roller method or a calendaring roller method. The embossing roller method is preferred. The texture types provided by the machine embossing are not limited and include rhombus texture, line texture, sawtooth texture, square texture, taper texture, circle texture, sub-circle texture, and irregular texture. The above-mentioned texture types can be used alone or in a combination of two or more.

The conditions for preheating and machine embossing can be adaptively adjusted depending on the constitution of the polymer film. In general, the temperature of the preheating roller can range from 10° C. to 100° C., specifically from 30° C. to 90° C., and more specifically from 60° C. to 75° C. The temperature of the embossing roller can range from 10° C. to 150° C., specifically from 80° C. to 140° C., and more specifically from 115° C. to 130° C. The torsion of the embossing roller can range from 0.1 N·m to 1.6 N·m specifically from 0.3 N·m to 1.3 N·m, and, more specifically, from 0.6 N·m to 1.0 N·m. The pressure of the embossing roller can range from 2 kg/cm$^2$ to 50 kg/cm$^2$, specifically from 10 kg/cm$^2$ to 45 kg/cm$^2$, and more specifically from 20 kg/cm$^2$ to 40 kg/cm$^2$.

With respect to the Sdq and Sq properties of the polymer film, studies have suggested that the Sdq and Sq value can be adjusted by controlling the temperature of the preheating roller, the temperature of the embossing roller, the pressure of the embossing roller and the torsion of the embossing roller. The larger the temperature of the preheating roller, the temperature of the embossing roller, and the torsion of the embossing roller, the greater the Sdq value of the polymer film. In general, the higher the temperature of the preheating roller and the temperature of the embossing roller, the softer the polymer film, making it easier to form deeper textures. The higher torsion of the embossing roller makes it easier to lower the uniformity of the textures on the surface of the polymer film and thus obtain a higher Sdq value. In addition, the higher the temperature of the preheating roller, the temperature of the embossing roller, and the pressure of the embossing roller, the higher the Sq value of the polymer film. In general, the higher pressure of the embossing roller makes it easier to lower the consistency of the height of the peaks on the surface of the polymer film and thus obtain a higher Sq value.

2. Laminated Glass

The polymer film of the present invention can be used to manufacture laminated glass. Thus, the present invention also provides laminated glass, which comprises a first glass sheet, a second glass sheet, and an intermediate film disposed between the first glass sheet and the second glass sheet, wherein the intermediate film is provided by the aforementioned polymer film.

The first glass sheet and the second glass sheet may be identical to or different from each other. The first glass sheet and the second glass sheet each can be any conventional glass sheet for manufacturing laminated glass. For example, the conventional glass sheets for manufacturing laminated glass include but are not limited to a float glass sheet, a tempered glass sheet, a wired glass sheet, or a plain plate-glass sheet, but the present invention is not limited thereto.

In the appended examples, float glass sheets are used as the first glass sheet and the second glass sheet.

The laminated glass of the present invention can be manufactured by any laminated glass manufacturing method known in the art. For example, laminated glass can be manufactured as follows. A polymer film is interposed between two glass sheets to obtain a laminated object. The conveying rate of conveyor belt of roller press is set to 2 m/min to 8 m/min, the temperature of first stage oven is set to 120° C. to 150° C., the pressure of first pair of rollers is set to 2 kg/cm$^2$ to 5 kg/cm$^2$, the temperature of second stage oven is set to 160° C. to 200° C., and the pressure of second pair of rollers is set to 3 kg/cm$^2$ to 10 kg/cm$^2$. The laminated object is placed on the conveyor belt and passed through the first stage oven, the first pair of rollers, the second stage oven, and the second pair of rollers in sequence, wherein the distance between the first pair of rollers is set to 4.5 mm to 6.5 mm, and the distance between the second pair of rollers is set to 4.5 mm to 6.5 mm. Afterward, the roller-pressed laminated object is cooled to room temperature to complete pre-pressing. The surface temperature of the glass sheet of the pre-pressed laminated object obtained therefrom ranges from 60° C. to 80° C. Then, the pre-pressed laminated object is placed in an autoclave and hot-pressed under a high pressure and temperature condition for 100 minutes to 150 minutes to obtain laminated glass. Generally, the high pressure and temperature condition refers to a pressure ranging from 10 bar to 15 bar and a temperature ranging from 100° C. to 150° C.

3. Example

3.1. Testing Methods

The present invention is further illustrated by the embodiments hereinafter, wherein the testing instruments and methods are as follows.

[Measurement of Molecular Weight Distribution of Polyvinyl Acetal]

The molecular weight distribution of polyvinyl acetal is measured by means of gel permeation chromatography (GPC), wherein polyvinyl acetal is dissolved in tetrahydrofuran (THF) and subjected to GPC analysis under the conditions below. The molecular weight of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF,
Waters Styragel HR1 THF

[Measurement of Acetalization Degree, Acetylization Degree and Hydroxyl Content of Polyvinyl Acetal]

The acetalization degree, acetylization degree and hydroxyl content of polyvinyl acetal are measured in accordance with JIS K6728.

[Measurement of Glass Transition Temperature (Tg)]

The Tg of the polymer film is measured in a nitrogen atmosphere by using a differential scanning calorimeter (model no.: TA DSC 25, available from TA Instruments). First, 7 mg of the polymer film as a sample is placed on the sample platform of the differential scanning calorimeter, heated to 150° C. with a heating rate of 10° C./min, and held at that temperature for 5 minutes. The sample is then balanced at −50° C. and held at that temperature for 5 minutes. After that, the sample is heated to 100° C. with a heating rate of 10° C./min to obtain a curve graph of temperature to heat flow (X-axis is temperature and Y-axis is heat flow). The temperature corresponding to the glass transition midpoint is recorded as Tg.

[Measurement of Sdq and Sq]

First, three test samples with a size of 3 cm×3 cm are cut from the polymer film in the width direction by selecting three parts at two ends and the middle. The surface textures of the polymer film are analyzed by using the test samples and a laser confocal microscope (model no.: LEXT OLS5000-SAF, available from Olympus) at a temperature of 24±3° C. and relative humidity of 63±3% in accordance with ISO 25178-2:2012, thereby obtaining the Sdq and Sq of the polymer film. The Sdq value of the polymer film is the average of the Sdq values of the three test samples, and the Sq value of the polymer film is the average of the Sq values of the three test samples. The measuring conditions are as follows: the light source has a wavelength of 450 nm, the objective lenses are 100× (MPLAPON-100×LEXT), the optical zoom is 60×, the image area is 1500 μm×1500 μm, the resolution is 1024 pixels×1024 pixels, the operation conditions are set to auto tilt removal, and no filter is used. The unit of Sq is

[Pre-Pressing Test]

First, the polymer film is interposed between two clean and transparent float glass sheets (length: 300 mm; width: 300 mm; thickness: 2 mm) to obtain a laminated object. Next, the conveying rate of conveyor belt of roller press is set to 4.5 m/min, the temperature of first stage oven is set to 120° C., the pressure of first pair of rollers is set to 3 kg/cm², the temperature of second stage oven is set to 180° C., and the pressure of second pair of rollers is set to 8 kg/cm². The laminated object is placed on the conveyor belt and passed through the first stage oven, the first pair of rollers, the second stage oven, and the second pair of rollers in sequence, wherein the distance between the first pair of rollers is set to 5 mm, and the distance between the second pair of rollers is set to 5 mm. Afterward, the laminated object is visually observed to check whether white haze is found and the transparency of the laminated object is determined by using laser. The criteria for the pre-pressing test are as follows, wherein the transparent region is directed to the region where no white haze is found.
- ⊚: the total area of white haze is 60% or less of the total area of the glass sheet, and the transparency of the transparent region is higher than 40%
- ○: the total area of white haze is 80% or less of the total area of the glass sheet, and the transparency of the transparent region is higher than 20%, excluding the case that the total area of white haze is 60% or less of the total area of the glass sheet and the transparency of the transparent region is higher than 40%
- x: the total area of white haze is higher than 80% of the total area of the glass sheet, and the transparency of the transparent region is lower than 20%

The operation of determining transparency via laser is described as follows. First, a power supply (model: MS2-H50, available from Keyence) is connected with a laser emitting-receiving device (model: LV-562, available from Keyence) and a data reader (model: LV-N11N, available from Keyence). Next, the laser emitting-receiving device and a reflecting mirror are placed on a foam, respectively, and the distance between the laser emitting-receiving device and the reflecting mirror is set to 30 cm. The beam of laser emitted from the laser emitting-receiving device is aligned with the center of the reflecting mirror. Afterwards, a laser is emitted to make the laser beam reach the reflecting mirror and then back to the laser emitting-receiving device, and the value obtained from the data reader is set as a blank value. Next, the pre-pressed laminated object is placed between the reflecting mirror and the laser emitting-receiving device and on the path where the beam of laser passes, and the values are read for six (6) selected transparent regions. Each of the obtained values is divided by the blank value to obtain the transparency (unit: %). The value of the transparency of six (6) regions are averaged to obtain the average of transparency.

The significance of the pre-pressing test is as follows. If the area of white haze is too large (such as higher than 80% of the total area of the glass sheet) or the transparency of a transparent region is too low (such as lower than 20%), the residual air is too much to be dissolved into the polymer film by the subsequent hot-pressing in an autoclave, meaning that the laminated glass will have bubble defects.

[High-Temperature Bubble Test (Weatherability Evaluation)]

A test sample with a size of 30 cm×30 cm is cut from the laminated glass. The test sample is placed vertically in an oven at 100° C. for 2 hours. Then, the test sample is taken out and visually observed to check whether bubbles are found. The criteria for the high-temperature bubble test are as follows.
- ⊚: No bubble is found
- ○: At least one bubble is found in the region that is 15 mm or less (shortest distance) away from the edge of the glass sheet, while no bubble is found in the region that is higher than 15 mm (shortest distance) away from the edge of the glass sheet.
- x: At least one bubble is found in the region that is higher than 15 mm (shortest distance) away from the edge of the glass sheet.

The significance of the high-temperature bubble test is as follows. Even the laminated glass may have no bubble defects when it is prepared; if too much air is dissolved into the polymer (dissolution of air), the air will be released to generate bubbles when the laminated glass is subjected to a high-temperature test, meaning that the laminated glass is poor in weatherability, and is unqualified for long term use.

3.2. Manufacture and Measurement of Properties of Polymer Film

First, 100 parts by weight of poly(vinyl butyral) (PVB, available from Chang Chun Petrochemical Co., Ltd.) and 40 parts by weight of a plasticizer (triethylene glycol bis(2-ethylhexanoate)) were mixed to obtain a mixture. The mixture was kneaded by using a mixer at 200° C. with a rotation speed of 150 rpm for 15 minutes. Then the mixture was cooled to room temperature to obtain a polymer film composition. The polymer film composition was placed in an extruder to obtain a polymer film with a thickness of 0.76 mm. The properties of the PVB and the polymer film, including the Mw, degree of acetalization, degree of acetylization and hydroxyl content of the PVB, as well as the Tg of the polymer film manufactured therefrom, were measured according to the aforementioned testing methods. The results are as follows: the Mw of the PVB is about 250,000 Daltons, the degree of acetalization of the PVB is 71.6 mol %, the degree of acetylization of the PVB is 0.4 mol %, the hydroxyl content of the PVB is 28 mol %, and the Tg of the polymer film is about 15° C.

The two surfaces of the polymer film were subjected to preheating and machine embossing in accordance with the parameter conditions as recited in Tables 1-1 and 1-2 to obtain the polymer films of Examples 1 to 6 and Comparative Examples 1 to 6. In addition to the parameter conditions recited in Tables 1-1 and 1-2, the linear velocity of the polymer film passing through the pair of embossing rollers is 3 m/min. The Sdq and Sq of the polymer films of Examples 1 to 6 and Comparative Examples 1 to 6 were measured according to the aforementioned testing methods. The results are listed in Tables 2-1 and 2-2.

TABLE 1-1

Conditions of machine embossing of the polymer films of Examples 1 to 6

| | | Parameter | | | |
|---|---|---|---|---|---|
| | | Temperature of preheating roller | Temperature of embossing roller | Torsion of embossing roller | Pressure of embossing roller |
| | | Unit | | | |
| | | °C. | °C. | N·m | kg/cm² |
| Example | 1 | 75 | 125 | 0.85 | 30 |
| | 2 | 60 | 115 | 0.60 | 20 |
| | 3 | 70 | 125 | 0.94 | 40 |
| | 4 | 65 | 120 | 0.69 | 30 |
| | 5 | 70 | 120 | 0.75 | 35 |
| | 6 | 75 | 130 | 0.88 | 25 |

TABLE 1-1

Conditions of machine embossing of the polymer films of Comparative Examples 1 to 6

| | | Parameter | | | |
|---|---|---|---|---|---|
| | | Temperature of preheating roller | Temperature of embossing roller | Torsion of embossing roller | Pressure of embossing roller |
| | | Unit | | | |
| | | °C. | °C. | N·m | kg/cm² |
| Comparative Example | 1 | 75 | 135 | 1.02 | 40 |
| | 2 | 80 | 135 | 1.06 | 25 |
| | 3 | 85 | 140 | 1.21 | 25 |
| | 4 | 70 | 125 | 0.90 | 45 |
| | 5 | 100 | 140 | 1.53 | 50 |
| | 6 | 70 | 120 | 0.67 | 50 |

TABLE 2-1

Properties of the polymer films of Examples 1 to 6

| | Example | | | | | |
|---|---|---|---|---|---|---|
| | 1 | 2 | 3 | 4 | 5 | 6 |
| Sdq | 1.25 | 0.38 | 1.45 | 0.66 | 0.94 | 1.38 |
| Sq (unit: μm) | 9.83 | 2.47 | 14.62 | 8.52 | 13.26 | 6.10 |

TABLE 2-1

Properties of the polymer films of Comparative Examples 1 to 6

| | Comparative Example | | | | | |
|---|---|---|---|---|---|---|
| | 1 | 2 | 3 | 4 | 5 | 6 |
| Sdq | 1.88 | 1.96 | 2.53 | 1.42 | 3.74 | 0.62 |
| Sq (unit: μm) | 18.25 | 10.24 | 9.50 | 19.67 | 27.62 | 22.31 |

3.3. Manufacture and Property Evaluation of Polymer Film

Laminated glass was manufactured respectively by using the polymer films of Examples 1 to 6 and Comparative Examples 1 to 6. First, the polymer film was cut into a size of 300 mm×300 mm. Then, two clean and transparent float glass sheets (length: 300 mm; width: 300 mm; thickness: 2 mm) were provided for each of the polymer films. The 300 mm×300 mm polymer films of Examples 1 to 6 and Comparative Examples 1 to 6 were interposed respectively between two transparent float glass sheets to obtain a laminated object. The laminated object was pre-pressed by means of evacuation using nip rollers. The pre-pressing was performed as follows. The conveying rate of the conveyor belt of the roller press was set to 4.5 m/min, the temperature of first stage oven was set to 120° C., the pressure of the first pair of rollers was set to 3 kg/cm², the temperature of the second stage oven was set to 180° C., and the pressure of the second pair of rollers was set to 8 kg/cm². The laminated object was placed on the conveyor belt and passed through the first stage oven, the first pair of rollers, the second stage oven, and the second pair of rollers in sequence, wherein the distance between the first pair of rollers was set to 5 mm, and the distance between the second pair of rollers was set to 5 mm. Then, the pre-pressed laminated object was taken out from the airtight bag, placed in an autoclave, and subjected to a hot-pressing at a pressure of 13 bar and a temperature of 135° C. for 120 minutes, and then cooled at room temperature to obtain the laminated glass.

The laminated glass of Examples 1 to 6 and Comparative Examples 1 to 6 were respectively subjected to the pre-pressing test and high-temperature bubble test according to the aforementioned testing methods. The results are listed in Tables 3-1 and 3-2.

TABLE 3-1

Evaluation results of the laminated glass manufactured using the polymer films of Examples 1 to 6

| | Example | | | | | |
|---|---|---|---|---|---|---|
| | 1 | 2 | 3 | 4 | 5 | 6 |
| Pre-pressing test | ◎ | ◎ | ○ | ◎ | ○ | ○ |
| High-temperature bubble test | ◎ | ◎ | ○ | ◎ | ○ | ◎ |

TABLE 3-2

Evaluation results of the laminated glass manufactured using the polymer films of Comparative Examples 1 to 6

| | Comparative Example | | | | | |
|---|---|---|---|---|---|---|
| | 1 | 2 | 3 | 4 | 5 | 6 |
| Pre-pressing test | X | X | X | ○ | X | ○ |
| High-temperature bubble test | X | X | X | X | X | X |

As shown in Table 3-1, the polymer films of the present invention show satisfactory results in the pre-pressing test via a nip roller system, and the laminated glass manufactured from the polymer films of the present invention shows satisfactory results in the high-temperature bubble test, manifesting good weatherability of the laminated glass. Examples 1 to 6 show that when the Sdq and Sq values of the polymer film are both within the designated ranges, the polymer film has a satisfactory result in the pre-pressing test via a nip roller system, and the manufactured laminated glass has a satisfactory result in the high-temperature bubble test. Particularly, Examples 1, 2, 4 and 6 show that the most outstanding result in the high-temperature bubble test was achieved when the Sq value of the polymer film ranges from 2 μm to 10 μm, and the most outstanding result in the pre-pressing test was achieved when the Sdq value of the polymer film ranges from 0.35 to 1.3. By contrast, as shown in Table 3-2, none of the comparative polymer films shows a satisfactory result in the pre-pressing test via a nip roller system, and none of the laminated glass manufactured from the comparative polymer films shows a satisfactory result in the high-temperature bubble test. Comparative Examples 2 and 3 show that even if the Sq value of the comparative polymer film is within the designated range, when the Sdq value of the comparative polymer film is not within the designated range the comparative polymer film cannot achieve a satisfactory result in the pre-pressing test via a nip roller system, and the laminated glass manufactured therefrom cannot achieve a satisfactory result in the high-temperature bubble test. Comparative Examples 4 and 6 show that even if the Sdq value of the comparative polymer film is within the designated range, when the Sq value of the comparative polymer film is not within the designated range the laminated glass manufactured therefrom cannot achieve a satisfactory result in the high-temperature bubble test, manifesting that the weatherability of the laminated glass is poor. Comparative Examples 1 and 5 show that when the Sdq and Sq values of the comparative polymer film are both outside the designated ranges, the comparative polymer film cannot achieve a satisfactory result in the pre-pressing test via a nip roller system, and the laminated glass manufactured therefrom cannot achieve a satisfactory result in the high-temperature bubble test.

The above examples are used to illustrate the principle and efficacy of the present invention and show the inventive features thereof but are not used to limit the scope of the present invention. People skilled in this field may proceed with a variety of modifications and replacements based on the disclosures and suggestions of the invention as described. Therefore, the scope of protection of the present invention is that as defined in the claims as appended.

What is claimed is:

1. A polymer film, which has a first exposed surface devoid of any additional film layers thereon and a second free surface devoid of any additional film layers thereon, wherein the first free surface has a root mean square gradient (Sdq) ranging from 0.38 to 1.45 and a root mean square height (Sq) ranging from 2.47 μm to 14.62 μm, wherein the Sdq and Sq are defined in accordance with ISO 25178-2: 2012, wherein the polymer film comprises poly(vinyl butyral) and a plasticizer, wherein the polymer film has a thickness ranging from 0.1 mm to 2.5 mm.

2. The polymer film of claim 1, wherein the second exposed surface has a root mean square gradient (Sdq) ranging from 0.38 to 1.45 and a root mean square height (Sq) ranging from 2.47 μm to 14.62 μm, wherein the Sdq and Sq are defined in accordance with ISO 25178-2:2012.

3. The polymer film of claim 1, which has a glass transition temperature (Tg) ranging from 5° C. to 30° C.

4. The polymer film of claim 2, which has a glass transition temperature (Tg) ranging from 5° C. to 30° C.

5. The polymer film of claim 1, wherein the polyvinyl acetal has a weight average molecular weight (Mw) ranging from 230,000 Daltons to 280,000 Daltons.

6. The polymer film of claim 2, wherein the polyvinyl acetal has a weight average molecular weight (Mw) ranging from 230,000 Daltons to 280,000 Daltons.

7. The polymer film of claim 1, wherein based on 100 parts by weight of the polyvinyl acetal, the amount of the plasticizer ranges from 30 parts by weight to 50 parts by weight.

8. The polymer film of claim 2, wherein based on 100 parts by weight of the polyvinyl acetal, the amount of the plasticizer ranges from 30 parts by weight to 50 parts by weight.

9. A laminated glass, which comprises a first glass sheet, a second glass sheet, and an intermediate film disposed between the first glass sheet and the second glass sheet, wherein the intermediate film is provided by the polymer film of claim 1.

10. A laminated glass, which comprises a first glass sheet, a second glass sheet, and an intermediate film disposed between the first glass sheet and the second glass sheet, wherein the intermediate film is provided by the polymer film of claim 2.

* * * * *